United States Patent [19]
Sullivan et al.

[11] Patent Number: 5,491,869
[45] Date of Patent: Feb. 20, 1996

[54] SILICONE RUBBER UTENSIL

[76] Inventors: Frank J. Sullivan, 534 Margaret Ct., Sun Prairie, Wis. 53590; Jean Mohrhauser, 4001 Country La., Racine, Wis. 53405

[21] Appl. No.: 207,969

[22] Filed: Mar. 9, 1994

[51] Int. Cl.$^6$ .................................................... B05C 17/10
[52] U.S. Cl. ........................ 15/245; 15/143.1; 16/110 R; 16/DIG. 18; 16/DIG. 19
[58] Field of Search ................................ 15/245, 236.01, 15/143.1; 16/110 R, 114 A, DIG. 18, DIG. 19

[56] References Cited

U.S. PATENT DOCUMENTS

| | | | |
|---|---|---|---|
| 1,541,088 | 6/1925 | Whitenack | 15/245 |
| 1,898,690 | 2/1933 | Schacht | 15/245 |
| 2,065,886 | 12/1936 | Clift | 15/245 |
| 2,900,656 | 8/1959 | Tupper | 15/245 |
| 2,901,762 | 9/1959 | Bell | 15/245 |
| 3,818,592 | 6/1974 | Himeno . | |
| 3,837,895 | 9/1974 | Pryor . | |
| 4,075,730 | 2/1978 | Siemund | 15/245 |
| 4,088,360 | 5/1978 | Jenkins . | |
| 4,302,512 | 11/1981 | Weitemeyer . | |
| 4,477,517 | 10/1984 | Rummel . | |
| 4,536,910 | 8/1985 | Clark . | |
| 4,544,692 | 10/1985 | Kuziemka . | |
| 4,585,705 | 4/1986 | Broderick . | |
| 4,623,565 | 11/1986 | Huybrechts . | |
| 4,684,577 | 8/1987 | Coq . | |
| 4,711,029 | 12/1987 | Somerset . | |
| 4,895,766 | 1/1990 | Saad . | |
| 4,898,772 | 2/1990 | Priesch . | |
| 4,969,268 | 11/1990 | Kelly | 16/110 R X |
| 5,037,701 | 8/1991 | Carre . | |
| 5,085,894 | 4/1992 | Pascucci . | |
| 5,149,161 | 9/1992 | Smith . | |
| 5,176,418 | 1/1993 | Niu . | |
| 5,212,012 | 5/1993 | Culbertson . | |
| 5,279,036 | 1/1994 | Rambin . | |
| 5,283,927 | 2/1994 | Gibbon . | |
| 5,312,413 | 5/1994 | Eaton . | |

FOREIGN PATENT DOCUMENTS 752113  7/1956  United Kingdom ................. 16/110 R

*Primary Examiner*—Chris K. Moore
*Attorney, Agent, or Firm*—Todd S. Parkhurst

[57] ABSTRACT

A utensil having a blade and handle portion that resists damage from the heat generated in cooking. The blade portion made of a rubber silicone compound which resists melting, burning, cracking, discoloring, or permanently bending, even under vigorous cooking situations. The handle is made of a heat-resistant glass reinforced PBT resin which is not susceptible to melting, scorching, absorbing odors, or discoloring. In addition, the molding process between the handle and the blade resists separation of the two parts and eliminates gaps which could house bacteria.

5 Claims, 1 Drawing Sheet

U.S. Patent
Feb. 20, 1996
5,491,869
FIG. 1
FIG. 2
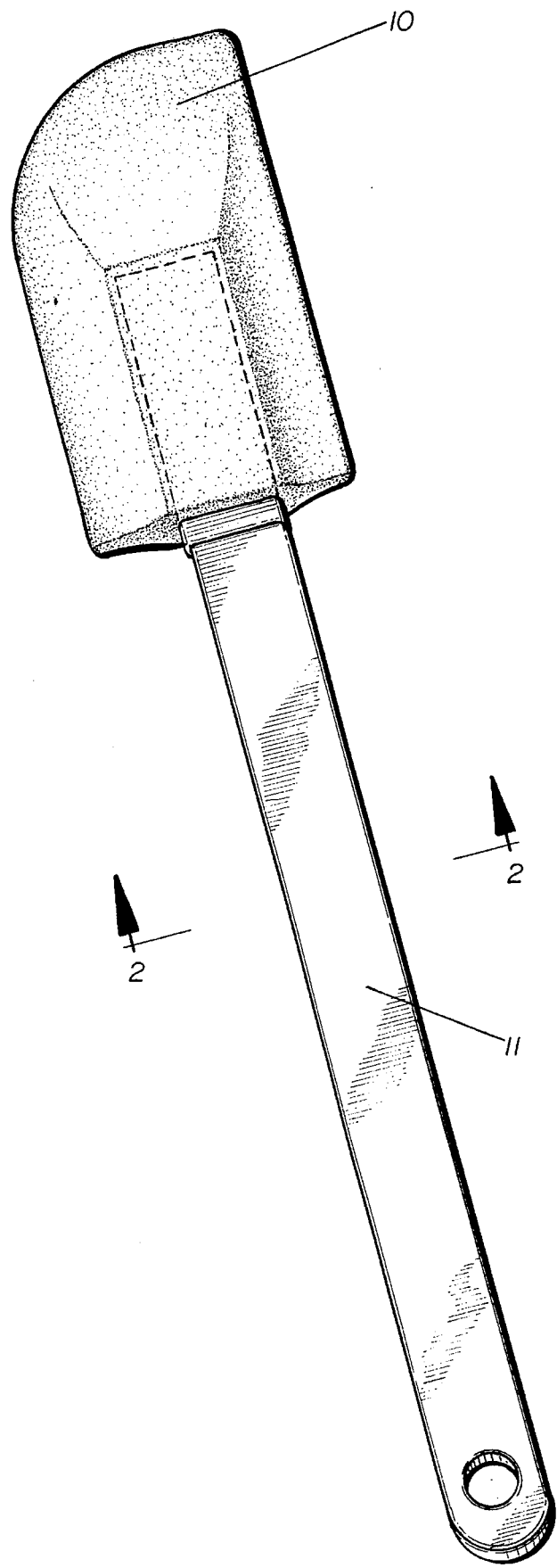
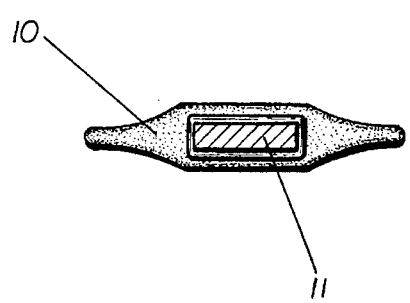

SILICONE RUBBER UTENSIL

BACKGROUND OF THE INVENTION

The present invention relates generally to utensils, and more particularly to a heat-resistant utensil with a flexible blade portion.

Utensils, especially spatulas and similar structures, have long been used in food preparation. They are used in a variety of situations, from mixing ingredients to dispensing foods. These utensils are also used in a wide variety of non-cooking applications. This may include laboratory or medical uses, where the utensil is used to dispense drugs, other chemical compounds, or liquids. Generally, the utensil is useful in situations where a flexible tool is required to cleanly and easily remove material sticking to the side of a container. A typical utensil has a rigid handle and a flexible blade which comes in contact with food. Those utensils meeting certain heat tolerance requirements are termed "heat-resistant" by their manufacturers.

Conventional utensils such as spatulas and other similar products, that are not heat-resistant, suffer severe damage in cooking applications. This includes partial or total melting of the blade or handle when subjected to high cooking temperatures. This may happen if the head comes in contact with the bottom of the pan or if the temperature of the food gets very high. These utensils are usually not used in cooking, but are generally reserved for dispensing cooked foods, or for working with cold foods.

Current designs of heat-resistant utensils also suffer certain disadvantages. The high heat of cooking eventually causes the utensils to deteriorate. This deterioration may come in the form of a brittle blade and small cracks along the areas where the blade is flexed. Once the blade begins cracking, minute rubber pieces could break off and fall into food. The blade may also become permanently bent if left in an awkward shape for extended periods of time, as may happen when thrown in a kitchen drawer. Another problem is the damaging effect that various chemicals and food ingredients have on the blade. In many cooking applications, spices and other chemicals can permanently discolor the blade. These chemicals may also cause the blade to crack in the portions that come in frequent contact with the chemicals. The cracks in the blade can become permanently stained thereby making the utensil unsightly and cause it to eventually crumble into pieces. Furthermore, most heat-resistant utensils have wooden handles. While the wooden handles are heat-resistant, they sometimes scorch when left in contact with the pan, leaving dark burn marks. Additionally, wooden handles have a tendency of discoloring or picking up odors of pungent foods and spices that they come into contact with. Dishwashing machines may also be detrimental to the finish of the wooden handle by ruining the finish or drying out the wood.

Another disadvantage of presently available utensils is evident at the point where the blade joins the handle. In current designs, a gap forms at the joint between the blade and handle. This gap is difficult to access, making the instrument difficult to clean and a possible bacteria carrier. In addition, because of the difference in expansion and contraction rates between rubber and wood, there is a tendency, after repeated cycles of heating and cooling, for the blade and handle to separate.

It is therefore an object of the present invention to provide a utensil that has a highly heat-resistant blade which is not susceptible to burning, melting, permanently bending, cracking, or staining. Another object of the invention is to provide a utensil with a heat-resistant handle which will not easily melt, scorch, discolor or absorb odors. A further object is to provide a utensil which resists separation and has no gap where the blade and handle join.

The present invention has been described with respect to certain embodiments and conditions which are not meant to and should not be construed to limit the scope of the invention. Those skilled in the art will understand that variations from the embodiment and conditions described herein may be made without departing from the invention as defined in the appended claims.

SUMMARY OF THE INVENTION

To provide a utensil having a highly heat-resistant blade which resists bending, cracking, or staining, in accordance with the invention, there is provided a handle made of PBT resin and a blade portion of silicone rubber gum molded to the handle. This molding process eliminates gaps where the blade joins the handle and makes separation of the parts virtually impossible. The particular blend of silicone rubber material is highly heat-resistant, and accordingly will not suffer damage when used repeatedly in cooking. Furthermore, the handle is made of highly heat-resistant plastic resin and is therefore also resistant to heat damage.

BRIEF DESCRIPTION OF THE DRAWINGS

FIG. 1 shows a side elevational view of a preferred embodiment of the invention.

FIG. 2 shows an elevational view in cross-section of the preferred embodiment.

DETAILED DESCRIPTION OF A PREFERRED EMBODIMENT

As shown in FIG. 1, the preferred embodiment of the invention is a utensil in the form of a spatula with a flexible silicone rubber blade 10 and a plastic handle 11. The plastic handle 11 is made of poly(butylene terephthalate) (PBT) resin.

A handle 11 is molded to a desired shape using a glass reinforced PBT resin. The preferred glass content is 30% by weight. A suitable resin is sold under the trademark Valox®420 by General Electric Corporation of Waterford, New York, although other resins may be used. Glass reinforcement of the resin creates a stiff and sturdy handle 11 able to withstand temperatures of up to 400 degrees fahrenheit. This high temperature tolerance is ideally suited for preventing heat damage to the handle 11 when cooking. Thus, the danger of melting the handle 11 if it accidentally comes into contact with metal pots and pans is eliminated. Furthermore, the handle 11 may be intentionally rested against the side of a dish which is cooking at or below 400 degrees fahrenheit without any problem. Additionally, the handle's 11 high temperature rating allows the utensil to be cured rapidly at high temperatures, thus facilitating high speed, low cost production. The efficiency of the process allows the utensil to be sold to the public at greatly reduced costs and with greater availability.

The blade 10 consists of a blend of silicone rubber able to withstand temperatures between −100 and 500 degrees fahrenheit. Such a temperature range is ideal for household applications where stove and oven temperatures may reach such levels. While cooking, the utensil can be used in a high heat situation and be thrown straight into the sink for washing. The utensil will suffer no damage going from the heat to the cold, and the operation can be repeated as needed. This ability is useful in situations where the utensil must be used for a number of foods, but where there is little time to let the utensil cool, get washed, and then be used again. With the present invention, the utensil can be pulled from the heat, run under relatively colder water, and be reused immediately.

The silicone rubber blend in this preferred embodiment is made of 65 durometer silicone rubber gum which is comprised of a mixture such as GE SE-6075 75 durometer gum and GE SE-6035 35 durometer gum, preferably methylvinyl silicone rubber gum sold by General Electric Company under the trademark Silplus®. A ratio of 1 part 75 durometer gum to approximately 0.17 parts 35 durometer gum will produce a 65 durometer gum. However, the durometer value, which is used in describing flexibility, may be varied as preferred. A high durometer rating (above 50) increases the blade's 10 stiffness, while lower durometer ratings (below 50) create a softer and more flexible blade 10. The flexibility of the utensil may be varied to suit differing needs. The durometer rating is varied by modifying the blend ratio of the various durometer gums. The gum mixture should constitute approximately 97.1 percent by weight of the silicone rubber blend. The remainder is constituted of 1.92 percent colorant and 0.96 percent peroxide catalyst.

The blend also preferably includes a coloring agent. A suitable agent in the preferred embodiment is available in the form of a white titanium dioxide paste from Ferro Corporation of Cleveland, Oh., and is sold under the trademark GV47018®. The coloring agent should constitute 1.92 percent or less by weight of the silicone rubber blend. If colorant is omitted, the GE silicon rubber blend should create an almost clear blade 10. Lack of color will not adversely affect the product, and various other colors may also be used. Colors other than white may be desirable in custom designing utensils for designer kitchen surroundings or in creating a more fashionable look in kitchenware. However, should the coloring agent be omitted, the peroxide catalyst should be increased to about 0.98 percent by weight to function properly with the increase in silicon rubber to almost 99 percent by weight of the blend.

Preferably, a peroxide catalyst or other similar catalytic agent useful for crosslinking polyolefins and elastomers is used as a setting agent for the silicone rubber compound to harden and give the blade 10 its desired consistency. A suitable catalyst of dicumyl peroxide is sold under the trademark Perkadox®BC-40-SPS by Akzo Chemical Company of Chicago, Ill. The catalyst should make up about 0.96 percent of the silicone rubber blend. Excess catalyst will not interfere with the formation of the blade 10, but may require a longer post-curing time to rid it of the extra catalyst. However, insufficient catalyst will prevent the silicon rubber mixture from curing properly. Other catalysts, such as a platinum catalyst, may also be used. The platinum catalyst requires no post-cure, but is considerably more expensive than the peroxide catalyst. If other than the recommended peroxide catalyst is used, percentages must be adjusted accordingly.

The handle 11 is first primed by dipping one end in a silicone in solvent primer of the kind sold commercially under the name Dow Corning®3-6060 by Dow Corning Corporation of Midland, Mi. The handle 11 is dipped in primer only up to the point where the blade 10 will be attached. The primer creates a bond during the molding process which seals the blade 10 to the handle 11. This essentially makes the utensil a one piece item, leaving no gap at the joint. Because there is no gap where the handle 11 joins the blade 10, there is no opportunity for bacteria buildup. Thus, the utensil is very easy to clean and will not house potentially dangerous bacteria. This advantage is readily seen when preparing such things as ground beef, rice, or other materials which may fragment or flow into the crevice of conventional spatulas. In the present invention, there is no crevice in which food may enter and decompose. In addition, the primer coupled with the molding process makes the blade 10 and handle 11 virtually inseparable. Therefore, the present invention is much more durable than any previously available product. Because of this durability, the consumer saves money and aggravation by not having to frequently replace broken utensils.

After the handles 11 have been dipped in the primer, they are allowed to air dry. The handle 11 dipping and drying operation should preferably take place under an exhaust hood to contain fumes.

The silicone rubber blend is compounded and milled on a two roll mill. The mill is made of a pair of closely positioned rollers. The material is fed into the mill and the rollers squeeze the material into a thin sheet. The sheet is rolled into 50 pound chunks called pigs which are then fed into the stuffer box of a millable injection press. The stuffer box is a container in the press which is subject to hydraulic pressure which dispenses the appropriate amount of silicon rubber. The silicone rubber blend is metered into a cylinder in the press and transferred into the tool. The handles 11 are then loaded onto a rack and shuttled into the molding tool in the press. The tool is heated to 400 degrees fahrenheit and the handles 11 and blades 10 are molded together. The utensils are then heat cured for two minutes. If a lower curing temperature is used, the time must be correspondingly increased. The curing temperature should not exceed the maximum temperature at which the utensil is rated. Otherwise, the handle 11 or the silicon rubber mix may burn.

After curing, the utensils are removed from the tool. Usable parts are then placed in an oven for post-cure. Post-cure drives off remaining peroxide catalyst which could cause odors should it remain in the utensil. The post-cure is done in an oven at 350 degrees fahrenheit for two hours. Once again, the temperature or time may be varied.

It can be appreciated from the foregoing description that the preferred embodiment of the present invention provides a utensil which is highly heat-resistant and resists cracking, discoloring, or losing its flexibility. Further, the preferred embodiment of the utensil has no gap where the blade 10 and handle 11 join, thereby eliminating an area where bacteria could build up.

The present invention has been described with respect to certain embodiments and conditions which are not meant to and should not be construed to limit the scope of the invention. Those skilled in the art will understand that variations from the embodiment and conditions described herein may be made without departing from the invention as defined in the appended claims.

What is claimed is:

1. A heat-resistant kitchen utensil comprising, in combination:

a glass-reinforced handle made of PBT resin; and a blade portion bonded to the handle.

2. The utensil of claim 1 wherein the handle is 30% glass reinforced plastic, thereby able to withstand high temperatures.

3. The utensil of claim 1 wherein the blade portion is made of a silicone rubber compound.

4. The utensil of claim 3 wherein the silicone rubber compound includes a coloring agent and a peroxide catalyst.

5. The utensil of claim 4 wherein the blade portion is made of 65 durometer silicone rubber gum.

* * * * *